Aug. 13, 1957     T. WEBER, JR     2,802,975
MEASURING CONDENSER FOR LIQUID QUANTITY GAUGES
Filed March 23, 1955
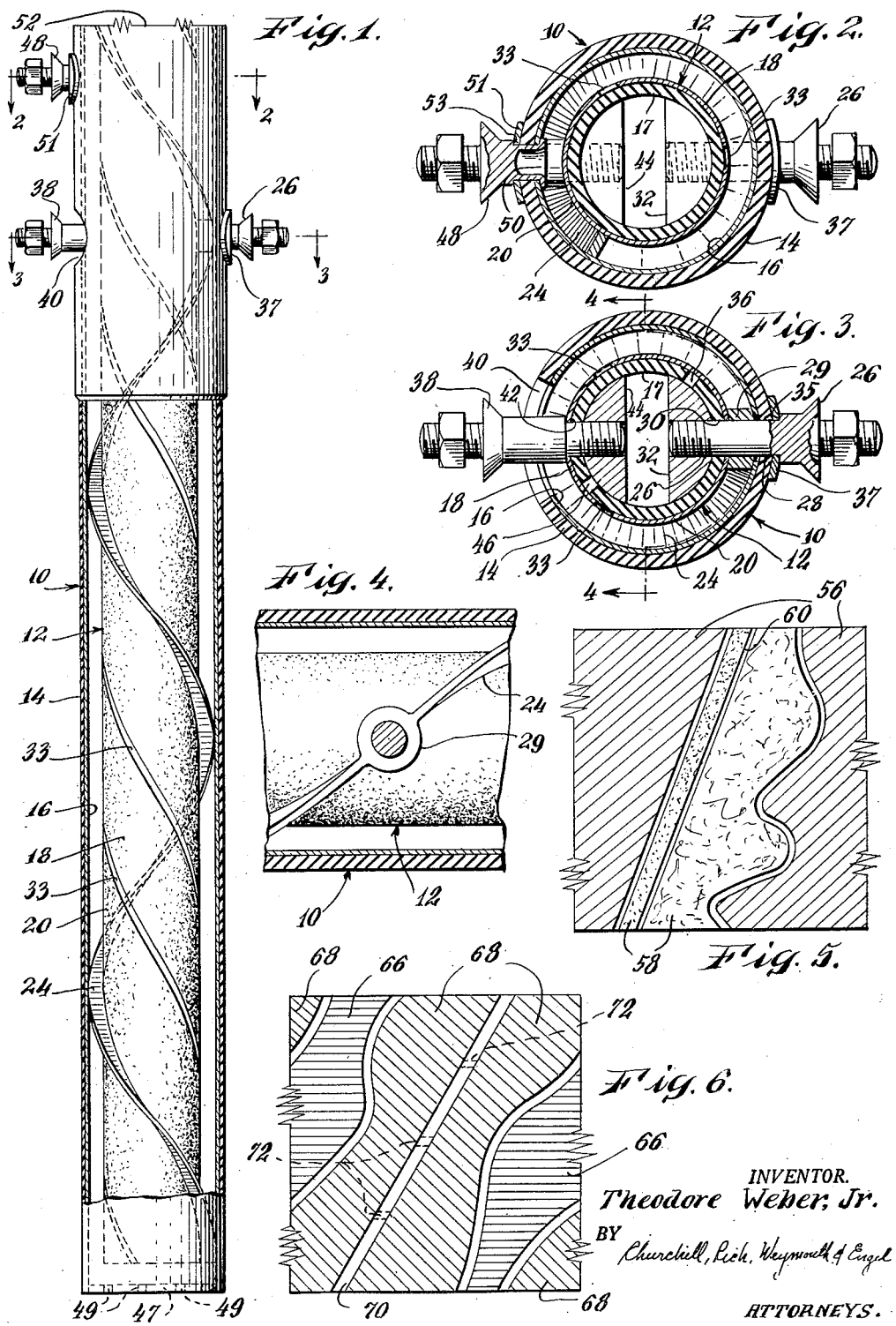
INVENTOR.
Theodore Weber, Jr.
BY
Churchill, Rich, Weymouth & Engel
ATTORNEYS.

United States Patent Office 2,802,975
Patented Aug. 13, 1957

2,802,975

MEASURING CONDENSER FOR LIQUID QUANTITY GAUGES

Theodore Weber, Jr., Tarrytown, N. Y., assignor to Simmonds Aerocessories, Inc., Tarrytown, N. Y., a corporation of New York Application March 23, 1955, Serial No. 496,214

10 Claims. (Cl. 317—246)

The present invention relates to condenser type liquid quantity gauges and more particularly to an improved measuring condenser for use in gauges of this type.

Liquid quantity gauges employing a condenser as the measuring element generally include, in addition to the condenser, an electrical measuring circuit for translating the instantaneous capacity of the condenser into a dial reading representing the quantity of liquid in a container. This type of gauge is particularly useful for the purpose of continuously indicating the quantity of fuel present in the tanks of an airplane. An example of a gauge of this type will be found in United States Patent No. 2,563,280, issued on August 7, 1951, to Curtiss R. Schafer and William J. Morley. As shown in this patent the condenser consists of a pair of tubular concentric electrodes adapted to be mounted in a liquid container such that the liquid rises in the space between the two tubes.

With the advent of jet aircraft, accuracy in the measurement of fuel has become of prime importance. It can thus be appreciated that variations in the capacity of the measuring condenser caused by factors other than the quantity of fuel in the container will adversely affect the gauge reading. Examples of such factors which give rise to erroneous readings are (1) lack of mechanical stability of the condenser structure and (2) the possibility of moisture collecting on the active electrode surface portions of the condenser. With poor mechanical stability normal vibration or other disturbances during use may cause variations in the spacing between the condenser electrodes with the result that changes occur in the condenser capacity. Accumulation of moisture will alter the effective dielectric constant of the dielectric medium occupying the space between the electrodes of the condenser and will therefore alter the capacity.

Previous attempts to produce a condenser having good mechanical stability and free from the problem of collecting moisture have been unsuccessful. This can be appreciated from the fact that the introduction of solid insulating material between the electrodes in order to maintain the spacing therebetween introduces, at the same time, surfaces upon which moisture may collect. The use of sturdier electrodes, per se, runs counter to the need for keeping the weight of the condenser at a minimum.

Among the purposes of the present invention is to provide a condenser having spaced electrodes and a spacer member therebetween which maintains such electrodes in predetermined spaced relationship throughout the length of the condenser, which provides minimum obstruction to the drainage of moisture that may collect thereon, which does not add materially to the weight of such condenser, and which is so constructed and arranged that whatever moisture does collect on the spacer will have no effect upon the active capacity of the condenser.

As will appear from the detailed description to follow, the invention is equally applicable to condensers designed for use in tanks or containers of uniform cross section as it is to condensers having irregularly shaped electrode surface portions intended for use with irregularly shaped containers. A typical condenser of the latter type is disclosed in U. S. Patent No. 2,582,399, issued January 15, 1952, to S. J. Smith. This last mentioned patent discloses a measuring condenser wherein the electrode members are formed by depositing a metallic coating upon the walls of a tube formed from insulating material.

The invention will be better understood after reading the following description with reference to the accompanying drawings in which:

Figure 1 is an elevational view partly in section showing the construction of a condenser embodying the present invention and intended for use in a regularly shaped container;

Fig. 2 is an enlarged cross-sectional view taken on line 2—2 of Figure 1;

Fig. 3 is an enlarged cross-sectional view taken on line 3—3 of Figure 1;

Fig. 4 is a fragmentary sectional view taken on line 4—4 of Figure 3;

Fig. 5 is a developed view of a portion of an inner electrode embodying the invention and representing a modification of the condenser shown in Figure 1 as applied to an irregularly shaped container; and Fig. 6 is a developed view similar to that of Figure 5 but showing an alternative embodiment thereof.

Referring now to Figures 1–4, the two electrode members are designated generally by the reference numerals 10 and 12, the outer electrode member being designated 10 and the inner electrode member being designated 12. The outer member 10 comprises a substantially rigid cylindrical supporting structure 14 formed from an insulating material upon whose inner surface there is deposited a coating 16. Coating 16 is highly conductive and may consist, for example, of silver or aluminum which has been deposited upon the surface of the cylinder 14 by spraying. Hereinafter coating 16 will be referred to as the outer electrode. The supporting structure, in a preferred embodiment, is formed from roved glass fibers which are impregnated with an epoxy resin which is insoluble in hydrocarbons, has good insulating properties and absorbs very little moisture. Such structure has been found to have sufficient rigidity and be free from attack by the usual fuels encountered in aircraft.

The inner electrode member 12 is constructed in a manner similar to the member 10 with the exception that two mutually insulated conductive coatings are employed and these are deposited on the external surface of the supporting structure 17. These coatings are designated 18 and 20 and extend along a substantially helical path throughout the length of the condenser. In the embodiment presently being described, the coating 18 will be referred to as the active electrode. The coating 20 will be referred to as the inactive or ground electrode, with the two terms being used interchangeably. As shown, the respective widths of the electrodes 18 and 20 are uniform, and the helical pitch is substantially constant throughout their length. The two coatings 18 and 20 are insulated from one another by providing gaps 33 therebetween. The gaps may be produced during the spraying process by placing a suitable mask on the surface of the supporting cylinder 17. Thus there is provided, in effect, two condenser sections having substantially independent zones of dielectric media between coatings 18 and 20 on the one hand and coating 16 on the other hand. With this construction it should be apparent that the capacity of each condenser section will change uniformly as liquid rises between the inner and outer electrode members and displaces the gaseous dielectric occupying the space therebetween. In the usual case the gaseous medium is air or a mixture of air and fuel vapor.

In order to locate the inner electrodes concentrically within the outer electrode and maintain a predetermined fixed spacing therebetween, there is provided a spacer member designated 24. This spacer has a substantially rectangular cross section, as seen in Figure 2, and is shaped in the form of a helix having substantially the same pitch as the helically shaped electrodes 18 and 20. As seen in Figure 2, the major transverse axis of the spacer is disposed normal to the surfaces of the inner and outer electrode members.

One method of construction is to secure, by cementing, spacer 24 to the inner electrode member 12 with the spacer following the center line of the ground electrode 20. The inner electrode member with the helical spacer mounted thereon may then be inserted within the outer electrode member with which it makes a fairly snug fit. Alternatively the spacer may be initially cemented to the outer electrode member and the inner electrode member inserted therein. Where more permanence is desired, the spacer may be cemented to both inner and outer electrode members; whereas under less stringent circumstances cementing may be dispensed with entirely.

In the embodiment under discussion, it will be assumed that the spacer is cemented only to the inner member 12, it being desirable to provide for easy disassembly. It is, therefore, necessary to provide some means for securing this inner electrode assembly in fixed position within the outer electrode member. This is accomplished by a threaded locating element 26 which passes through an aperture 28 in the electrode member 10 and through an enlarged circular boss 29, forming a part of the spacer member 24 as best seen in Figure 4, and then through an aperture 30 in the inner electrode member to threadedly engage a retaining element 32. The retaining element 32 is in the form of a metallic block shaped to conform to the inner surface of the supporting structure 17. The outer end of the element 26 is provided with a shoulder 35 abutting the outer surface of the outer electrode member 10. If desired a pad 37 may be interposed therebetween. It should be noted that the coating 16 is cut back around the aperture 28 in the outer electrode member in order that it will not make electrical contact with element 26. From the drawing it will be evident that the element 26 is constructed in the form of a binding post and, thus, it may be attached by an electrical conductor to the measuring circuit. The element 26 is formed of electrically conductive material and the retaining element 32 is electrically connected to the ground electrode 20 by means of a conductive connection 36. This provides a continuous electrical circuit between the binding post and the ground electrode. Thus the threaded element 26 serves a dual function of securing the inner and outer electrode members together, and providing for external connection to the ground electrode.

The boss 29 is provided in the spacer 24 in order to avoid buckling, breaking or other damage to the spacer when the threaded element 26 is screwed into the retaining element 32 and subsequently tightened. In a typical condenser construction having an outer electrode member 10 approximately 1 inch in diameter it has been found that a helical spacer having a thickness of .060 inch and a height of .125 inch is quite satisfactory. An advantage of the helical spacer which has been described is that the walls of the supporting structures can be made very thin with the attendant reduction in weight. As an example, condensers have been constructed having wall thicknesses of .020 inch.

The helical spacers preferably are produced by casting in the helical shape using an epoxy resin. A suitable resin of the epoxy type is manufactured by the Ciba Company under the designation "Araldite" 502. Numerous other epoxy resins have been found to be suitable as long as they possess the properties of high physical strength, dimensional stability, high electrical resistance, low moisture absorption, and insolubility in liquid hydrocarbons.

The helix preferably is cast in several sections which are subsequently cemented end-to-end. The side walls of the helix preferably should be given a slight taper either inwardly or outwardly to facilitate casting. A pitch angle for the helix of 30° has been found to provide the most satisfactory compromise between structural strength and moisture drainage.

In order to provide for the connection of the active electrode 18 to the measuring circuit, there is provided a binding post 38. This binding post is in the form of a threaded metallic element which passes through a large clearance aperture 40 in the outer electrode member 10 and through an aperture 42 in the inner electrode member 12 to be threadedly engaged by the metallic retaining element 44. This construction is best seen in Figure 3 wherein retaining element 44 is shown conductively connected to the active electrode 18 by means of a connection 46. In the instant embodiment the binding posts for connection to the active inner electrode and to the ground electrode, respectively, are located in a common cross-sectional plane. Upon altering the geometry of the inner electrodes it may be found desirable, if not necessary, to locate the binding posts at different points along the length of the condenser.

A third binding post 48, as best seen in Figure 2, is provided for making connection with the outer electrode 16. Binding post 48 has a hollow cylindrical end section which passes through an aperture in the outer electrode member 10 and has its open end flared at 50 in order to simultaneously make contact with the coating 16 and rigidly secure the binding post to the electrode member. A pad 51 may be interposed between the shoulder 53 and the member 10.

When the condenser, which has been described above, is connected in a measuring circuit of the "rebalancing bridge type" the outer electrode 16 may be connected through its associated binding post 48 with one end of the bridge transformer. The active electrode 18 may be connected through its binding post 38 to the input of the amplifier which supplies current to the rebalancing motor. The ground electrode 20 may be connected through its respective binding post 26 to an intermediate point on the bridge transformer by way of a common ground or reference point. In this manner the grounded electrode serves to eliminate fringe effects which would normally be present. The employment of a grounded electrode as described herein forms no part of the present invention and is covered in copending application No. 361,003, filed June 11, 1953, in the name of Stanley James Smith and assigned to the same assignee as the present application, and is now abandoned. A typical "rebalancing bridge type" circuit is described in the aforementioned Patent No. 2,563,280.

Referring now specifically to Figure 1 it will be observed that the bottom of the outer member 10 is provided with a cap 47 having a plurality of perforations or ports 49. The lower end of the electrode member 12 is terminated a short distance above cap 47 to provide a safety factor for avoiding bridging of the active electrodes by moisture collecting above the cap. In practice a clearance of .200 inch has been found satisfactory. Although the upper end of the condenser has been broken away in the drawing, the portion above the break 52 is similar to the lower end, having a perforated cap with the inner member 12 terminating a short distance therefrom. The condenser may be mounted in a container by a pair of shackles or straps positioned near its ends. Since aircraft fuel is a poor electrical conductor, the binding posts need not be sealed nor provided with other external insulation. Naturally, if the condenser is to be used to measure a conductive liquid it will be necessary to coat all the metallic parts with a layer of insulation.

In most applications of the invention it is necessary to profile one of the active electrodes as taught in the above mentioned Patent No. 2,582,399, in order to provide a linear output when measuring the contents of an irregularly shaped container. A modification of the present invention wherein the inner active electrode is profiled, is shown in Figure 5. Referring to the figure, the active electrode is designated 56, the ground electrode is designated 58 and the helical spacer is designated 60. Because this is a developed section, the helix shows up as a straight line on the drawing. It will be observed that one edge of the active electrode 56 follows a straight line whereas the opposite edge of this electrode follows an irregular path. The ground electrode 58 has its borders contiguous to the borders of the active electrode allowing merely enough space therebetween to provide for suitable insulation. Naturally in the physical embodiment, both electrodes will take on a substantially helical form. The helical spacer is provided with the same pitch as the straight edge of the active and ground electrodes and is mounted in superposition on the ground electrode, spaced a constant distance from the straight edge thereof. This constant spacing follows naturally from the choice of identical pitch angles for the helices.

In some instances it may be preferable to profile both edges of the active and ground electrodes in the manner shown in Figure 6. In this figure the active electrode, ground electrode, and helical spacer are designated, respectively, 66, 68 and 70. In this form of the invention the helical spacer may be located along the center line of the ground electrode.

In order to improve the cement bond between the helical spacer and the supporting structure of the inner electrode member, the coating which comprises the ground electrode is removed or masked over the greater portion of the area to be covered by the spacer. At spaced intervals, however, a short connecting strip of coating is provided such as at points 72 in Figure 6, in order to keep both halves of the ground electrode electrically united. Since the metallic coatings are of negligible thickness, the strips 72 will not interfere with the location of the spacer. It is to be understood that the removal or elimination of the ground coating beneath the helical spacer may be applied equally well to all of the embodiments of the invention heretofore described. Likewise, with respect to all of the embodiments, it is not necessary for the ground electrode to actually contact the spacer member.

Although it has been assumed throughout the above description that the pitch of the various helices remains constant throughout their length, it may be desirable under certain circumstances to permit this pitch to vary, in which case the helix might be termed more appropriately a spiral. Whenever the pitch is varied along the length of the condenser it is important that the spacer be superimposed upon the ground electrode so that moisture collecting on the spacer does not constitute part of the dielectric between the active electrodes.

There has thus been described a novel condenser construction employing a spacer which is capable of rigidly locating one tubular electrode within another. By its configuration any moisture that may condense or tend to collect on its surface will be provided with an unimpeded drainage or run-off path. However, if some moisture should fail to run-off it still will not interfere with the normal reading of the condenser because the spacer is positioned outside of the electrostatic field which is developed between the two active electrodes when the condenser is in operation.

What I claim is:

1. A measuring condenser for a liquid quantity gauge comprising a pair of spaced concentric tubular electrode members adapted to be mounted in a container for immersion in the liquid therein to substantially the entire depth of the liquid and to receive the liquid in the space between said electrode members, said electrode members each having an active electrode surface portion extending throughout its length, at least one of said members having additionally a helically disposed inactive electrode surface portion extending throughout its length, and a substantially continuous non-conductive helical spacer element extending throughout substantially the entire length of the condenser in the space between the electrode members in space maintaining engagement therewith and occuping only a small portion of the inter-electrode space, said spacer element overlying the helically disposed inactive electrode surface portion of said one electrode member throughout the length of the spacer element with no portion of said spacer element extending beyond the margins of said inactive electrode portion, whereby the accumulation of liquid upon said spacer element will not affect the capacity of the condenser as measured between said active electrode portion on the one electrode member and the active electrode portion on the other electrode member.

2. A measuring condenser for a liquid quantity gauge comprising a pair of spaced concentric electrode members having eelectrode surface portions and adapted to be mounted in a container for immersion in the liquid therein to receive the liquid in the space between said electrode members as a function of the quantity of liquid in the container, at least one of said electrode members having two mutually insulated electrode surface portions each extending longitudinally of the condenser along a spiral path and forming with the other electrode member two condenser sections having substantially independent zones of dielectric media, and an elongated spiral strip of non-conductive material disposed in the space between said electrode members in space maintaining engagement therewith extending wholly within one zone of said dielectric media, whereby said electrode members are maintained in predetermined spaced relationship with the capacity of the condenser section having the other zone of dielectric media being independent of the effect of liquid accumulating on said strip of non-conductive material, such accumulation being discouraged by reason of the nature of said spiral strip.

3. A measuring condenser according to claim 2, wherein the inner electrode member is shorter than the outer electrode member and is located with respect to the outer electrode member such that at least the lower end of the latter extends beyond the corresponding end of the former, whereby moisture collecting at the lower end of the condenser does not interfere with its capacity.

4. A measuring condenser for a liquid quantity gauge comprising a pair of spaced concentric electrode members having electrode surface portions and adapted to be mounted in a container for immersion in the liquid therein to substantially the entire depth of the liquid and to receive the liquid in the space between said electrode members, at least one of said electrode members having two mutually insulated electrode surface portions extending throughout substantially the entire length of the condenser along a spiral path and forming with the other electrode member two condenser sections having substantially independent zones of dielectric media, a pair of binding posts each electrically connected to a different one of said two electrode surface portions, a third binding post electrically connected to an electrode surface portion on the other one of said electrode members, and a spiral strip of non-conductive material disposed in the space between said electrode members in space maintaining engagement therewith extending throughout substantially the entire length of the condenser wholly within one zone of said dielectric media, whereby said electrode members are maintained in predetermined spaced relationship, and the capacity of the condenser section having the other zone of dielectric media is independent of the effect of liquid accumulating on said strip of non-conductive material.

5. A measuring condenser according to claim 4, wherein one of said three binding posts comprises a threaded metallic element which passes through an aperture in the wall of the outer electrode member, through an aperture in the strip of non-conductive material, and through an aperture in the wall of the inner electrode member, and is threadedly secured in a retaining element disposed within the inner electrode member without interconnecting electrically the electrode surface portions through which it passes, whereby said inner and outer electrode members are restrained against relative movement.

6. A measuring condenser for a liquid quantity gauge comprising a pair of spaced concentric electrode members having electrode surface portions and adapted to be mounted in a container for immersion in the liquid therein to substantially the entire depth of the liquid and to receive the liquid in the space between said electrode members, at least one of said electrode members having two mutually insulated electrode surface portions each extending throughout substantially the entire length of the condenser along a substantially helical path and forming with the other electrode member two condenser sections having substantially independent zones of dielectric media, and a substantially helical strip of non-conductive material disposed in the space between said electrode members in space maintaining engagement therewith extending throughout substantially the entire length of the condenser wholly within one zone of said dielectric media, all of the helices having substantially the same pitch when measured at the same point along the length of the condenser, whereby said electrode members are maintained in predetermined spaced relationship, and the capacity of the condenser section having the other zone of dielectric media is independent of the effect of liquid accumulating on said strip of non-conducting material.

7. A measuring condenser according to claim 6, wherein a single electrically conducting locating element is provided which passes through an aperture in the wall of the outer electrode member, through an aperture in the strip of non-conductive material, and through an aperture in the wall of the inner electrode member, and includes means abutting the outer and inner surfaces, respectively, of the outer and inner electrode members without interconnecting electrically those electrode surface portions through which it passes, said locating element further having means for making an external electrical connection thereto, and means electrically connecting said locating element internally to that one of said mutually insulated electrode surface portions which borders the zone of dielectric media containing said strip of non-conductive material, whereby said locating element functions both as a binding post for making external electrical connection to one of said electrode surface portions and secures together and locates said electrode members with reference to each other.

8. A measuring condenser for a liquid quantity gauge comprising a pair of spaced concentric tubular electrode members having electrode surface portions and adapted to be mounted in a container for immersion in the liquid therein to substantially the entire depth of the liquid and to receive the liquid in the space between said electrode members, at least one of said electrode members having two mutually insulated electrode surface portions each extending throughout substantially the entire length of the condenser along a substantially helical path and forming with the other electrode member two condenser sections having substantially independent zones of dielectric media, and a substantially helical strip of dimensionally stable non-conductive material disposed in the space between said electrode members in space maintaining engagement therewith extending throughout substantially the entire length of the condenser wholly within one zone of said dielectric media, said strip being of substantially rectangular cross-section and having its major transverse axis substantially normal to the surfaces of said electrode members at the points of engagement therewith throughout the length of said strip, whereby said electrode members are maintained in predetermined substantially rigid spaced relationship, and the capacity of the condenser section having the other zone of dielectric media is independent of the effect of liquid accumulating on said strip of non-conductive material.

9. A measuring condenser for a liquid quantity gauge comprising a pair of spaced concentric tubular electrode members having electrode surface portions and adapted to be mounted in a container for immersion in the liquid therein to substantially the entire depth of the liquid and to receive the liquid in the space between said electrode members, the inner electrode member having two mutually insulated outer electrode surface portions extending throughout substantially its entire length along parallel substantially helical paths and forming with the other electrode member two condenser sections having substantially independent zones of dielectric media; a strip of dimensionally stable non-conductive material disposed in the space between said electrode members in space maintaining engagement therewith extending throughout substantially the entire length of the condenser along a substantially helical path wholly within one zone of said dielectric media; a single locating element passing successively through an aperture in the wall of the outer electrode member, an aperture in the strip of non-conductive material, and an aperture in the wall of the inner electrode member, and including means abutting the outer and inner surfaces, respectively, of the outer and inner electrode members without interconnecting electrically those electrode surface portions through which it passes, said locating element further having means for making an external electrical connection thereto; and means electrically connecting said locating element internally to that one of said two mutually insulated electrode surface portions which borders the zone of dielectric media containing said strip of non-conductive material; whereby said locating element functions both as a binding post for making electrical connection to one of said electrode surface portions and secures together and locates said electrode members with reference to each other.

10. A measuring condenser for a liquid quantity gauge comprising a pair of spaced tubular electrode members disposed one within the other and adapted to be mounted in a container for immersion in the liquid therein to substantially the entire depth of the liquid and to receive the liquid in the space between said electrode members, said electrode members each having an active electrode surface portion extending substantially throughout its length, at least one of said members having additionally an inactive electrode surface portion extending substantially throughout its length, a dimensionally stable non-conductive spacer element disposed in the space between the electrode members in space maintaining engagement therewith and occupying only a small portion of the inter-electrode space, said spacer element overlying the inactive electrode surface portion of said one electrode member so as to be outside of the electrostatic field zone between said active electrode portion on the one electrode member and the active electrode portion on the other electrode member, a single electrically conductive locating element passing through an aperture in the wall of the outer electrode member, through an aperture in the spacer element, and through an aperture in the wall of the inner electrode member, said locating element including means abutting the outer and inner surfaces, respectively, of the outer and inner electrode members without interconnecting electrically those electrode surface portions through which it passes, said locating element further having means for making an external electrical connection thereto, and means electrically connecting said locating element internally to the surface portion of the inner tubular member through which the locating element passes, whereby said locating element functions both as a binding post for making external electrical connection to one of said electrode surface portions and secures together and locates said electrode members with reference to each other.

References Cited in the file of this patent

UNITED STATES PATENTS 2,699,523    Meyers      Jan. 11, 1955

FOREIGN PATENTS 938,646    France      Apr. 12, 1948